United States Patent [19]
Hettich et al.

[11] Patent Number: 6,152,433
[45] Date of Patent: Nov. 28, 2000

[54] MOTOR VEHICLE AXLE

[75] Inventors: Ralph Hettich, Kernen; Guenter Hoelzel, Hochdorf, both of Germany

[73] Assignee: DaimlerChrysler AG, Stuttgart, Germany

[21] Appl. No.: 09/145,233

[22] Filed: Sep. 2, 1998

[30] Foreign Application Priority Data

Sep. 2, 1997 [DE] Germany .................. 197 38 249

[51] Int. Cl.$^7$ ................................. B60G 21/04
[52] U.S. Cl. ............................ 267/188; 180/352
[58] Field of Search ................... 267/195, 148, 267/149, 188, 273, 154, 183; 180/352, 349, 362

[56] References Cited

U.S. PATENT DOCUMENTS

| | | | |
|---|---|---|---|
| 3,756,646 | 9/1973 | Gimlett et al. | 295/43 |
| 4,883,289 | 11/1989 | Sardou | 280/684 |
| 5,129,672 | 7/1992 | Hiromoto et al. | 280/720 |
| 5,509,684 | 4/1996 | Yarrow et al. | 280/720 |
| 5,564,521 | 10/1996 | McLaughlin et al. | 180/352 |
| 5,885,688 | 3/1999 | McLaughlin | 428/131 |
| 6,022,035 | 2/2000 | Habich | 280/124.128 |
| 6,073,991 | 6/2000 | Naert | 296/197 |

FOREIGN PATENT DOCUMENTS

| | | |
|---|---|---|
| 2 570 994 | 4/1986 | France . |
| 29 52 176 C2 | 7/1981 | Germany . |
| 30 04 194 A1 | 8/1981 | Germany . |
| 35 35 783 C2 | 12/1988 | Germany . |
| 42 14 912 A1 | 11/1993 | Germany . |
| 42 16 640 C2 | 11/1993 | Germany . |
| 295 19 965 U1 | 5/1997 | Germany . |
| 4-169309 | 6/1992 | Japan . |
| 6-278433 | 10/1994 | Japan . |
| 6278433 | 10/1994 | Japan . |

*Primary Examiner*—Michael Mar
*Assistant Examiner*—Melanie Talavera
*Attorney, Agent, or Firm*—Evenson, McKeown, Edwards & Lenahan, P.L.L.C.

[57] ABSTRACT

A motor vehicle axle is made of metal and jacketed at least areawise with a bonded fiber material. Thereby the stiffness and strength of the motor vehicle axle is increased with a favorable axle weight.

15 Claims, 2 Drawing Sheets

MOTOR VEHICLE AXLE

BACKGROUND OF THE INVENTION

This application claims the priority of German Application No. 197 38 249.5, filed Sep. 2, 1997, the disclosure of which is expressly incorporated by reference herein.

The present invention relates to a motor vehicle axle.

It is known to manufacture motor vehicle axles economically from metal. If these motor vehicle axles are also intended to possess sufficient strength and rigidity to withstand high loads, they must be given large dimensions, causing their weight to increase considerably. This procedure can result in installation problems, and also has a disadvantageous effect on the furl consumption of the vehicle.

JP 04-169309 (A) describes a suspension link for a wheel suspension in which an air guide channel is formed for the brake disk. In addition, FR 25 70 994 A1 describes a suspension link for a wheel suspension being formed of molded parts that have shell-shaped cross section.

A suspension link for a wheel suspension of a motor vehicle is shown in DE 42 16 640 C2. This link has two elongate molded parts with a shell-shaped cross section. The parts are welded together at their lateral edges extending lengthwise to form a molded part body delimiting or defining a cavity. To increase the rigidity, edgewise reinforcing beads are pressed into the steel sheet. However, the design possibilities and hence possible increases in strength are also limited by the specified material properties.

A suspension link is described in JP 06-278 433 (A) in which a cable can be guided in and out through openings in the suspension link. A semi-independent suspension for motor vehicles is described in DE 30 04 394 A1 and is made as a one-piece structural unit from fiber-filled plastic. A suspension of this kind is subject to limited design requirements and possesses only limited elongation at rupture, which can readily lead to a suspension link tearing off under high load, as might occur for example when striking a curb.

Reference is made for general background regarding shell-shaped cooperating molded parts on suspension links of a wheel suspension to DE 29 52 176 C2 and DE 295 19 965 U1.

SUMMARY OF THE INVENTION

An object of the present invention resides in increasing the rigidity and strength of a motor vehicle axle with a favorable axle weight.

This goal has been achieved by providing a metal motor vehicle axle which is jacketed areawise with a bonded fiber material.

By jacketing a motor vehicle axle made of metal at least areawise with a bonded fiber material (e.g. CfK), the rigidity and strength of the motor vehicle axle are increased by the fiber structure in the outer skin, without the weight of the motor vehicle axle being unfavorably significantly increased. The motor vehicle axle remains deformable under load with high tearing strength. The metal body of the motor vehicle axle can thus have smaller dimensions so that less installation space is required for the motor vehicle axle and weight can be saved as well.

The advantages of this jacketing have an especially advantageous effect in a suspension link for the wheel suspension.

By securing at least one tube running lengthwise in the suspension link or by securing an elongate shell element at both lengthwise edges to at least one lengthwise side of the molded body, the stability of the suspension link is increased even further.

A suspension link with tubes secured internally, e.g. by welding or soldering, can be shaped with its shell-shaped molded parts primarily in accordance with aerodynamic principles, while the tubes contribute to the necessary strength and/or rigidity without restricting design.

In addition, the elongate shell element, on at least one side of the molded part body of the suspension link, allows the molded part body to adapt to the strength requirements and can then, in addition to increasing the strength, also assume aerodynamic tasks by virtue of its configuration.

Cables or lines can be run through the tubes that are secured in the cavity of the molded part body and/or in the cavity of the shell element so as then not to create any problems outside the suspension link and not to be capable of themselves being damaged. As a result, no additional attachment points for the cables or lines are provided along the suspension link either, so that the latter, under the tension resulting from a crash, can yield for a distance in the lengthwise direction and are not immediately torn away. Because the cables and leads serve for ABS control, as brake lines, or as power cables for example, this is a safety advantage. The cables and lines can be introduced through openings provided in the suspension links into the respective tubes and are guided through the tubes to the outlet points provided on the suspension links.

The suspension link can terminate at its free ends in end plates, to keep dirt and moisture away from the cavities.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
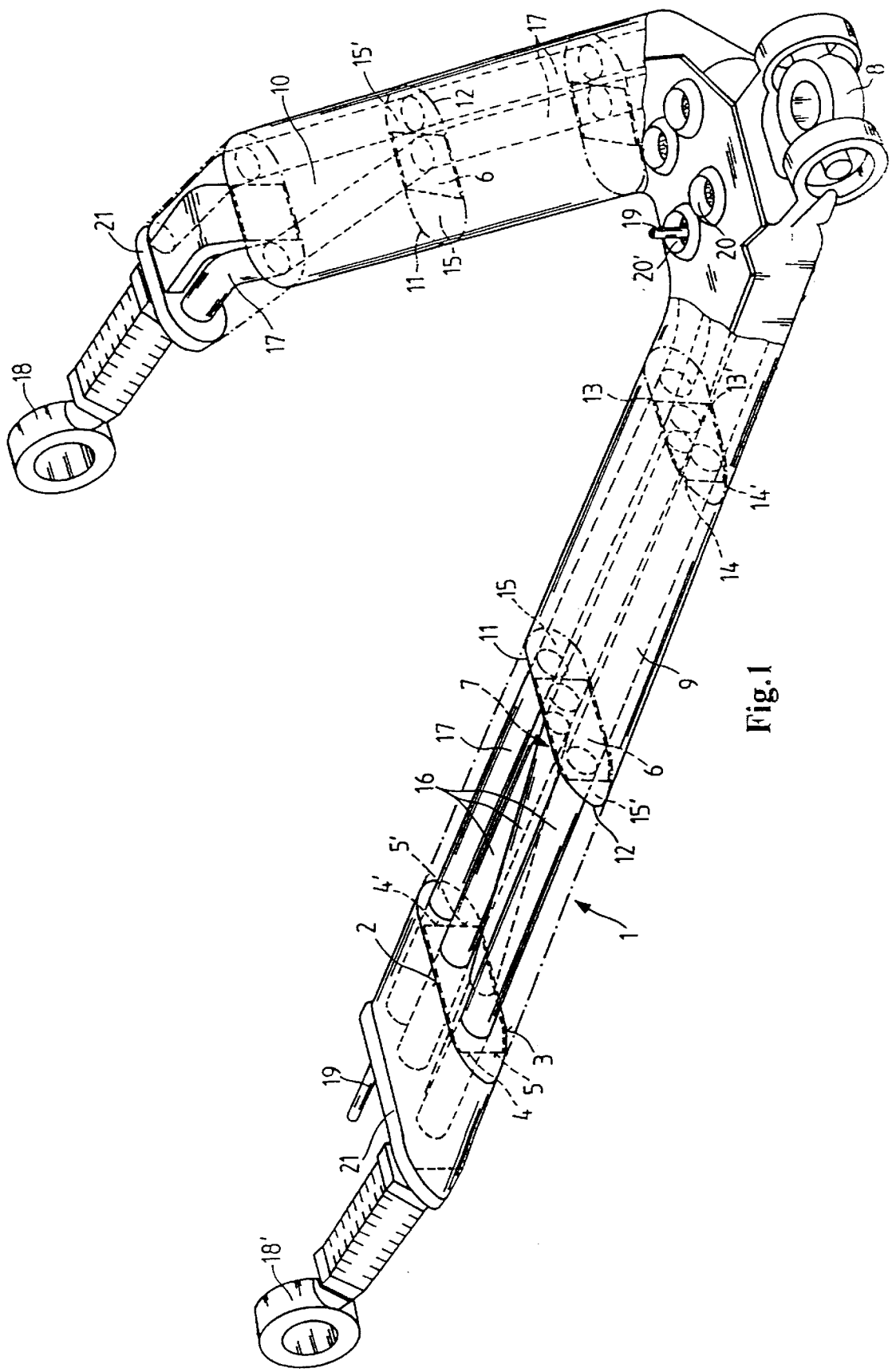
FIG. 1 is a perspective view of a motor vehicle axle suspension link.

The illustrated V-shaped suspension link 1 of a motor vehicle axle for a wheel suspension of a motor vehicle is made of, for example, titanium or steel.

By jacketing a motor vehicle axle made of metal at least areawise with a bonded fiber material, e.g. CfK, the rigidity as well as the strength of the motor vehicle axle are increased by the fiber structure on the outer skin, without significantly increasing the weight of the motor vehicle axle unfavorably thereby. The motor vehicle axle then remains deformable under load with a high tearing strength. The metal body of the motor vehicle axle can then be made smaller, so that less installation space is required and weight can be reduced as well. These advantages are especially favorable in a suspension link 1 for the wheel suspension.

Suspension link 1 has two elongate molded parts 2, 3 having a shell-shaped cross section with their lateral lengthwise edges 4, 4' and 5, 5' soldered or welded together to form a molded part body 7 delimiting or defining a cavity 6.

Figure 3:
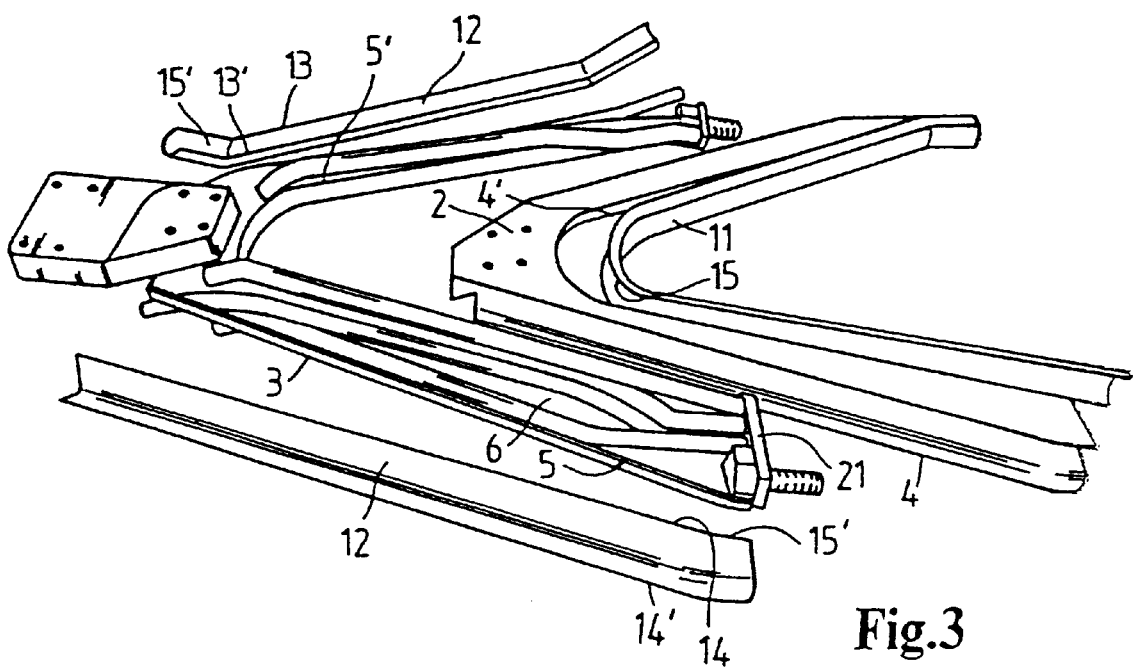
FIG. 3 is a perspective exploded view which shows the individual parts of a suspension link similar to FIGS. 1 and 2.

Shell elements 11, 12 are soldered or welded laterally by lengthwise edges 13, 13' and 14, 14' to this molded part body 7 with its cavity 6, i.e. to the inner side as well as the outer side of the suspension link legs 9, 10 that project from a bearing point 8 of suspension link 1. The internal shell element 11 is made in one piece as shown in FIG. 3 and is guided around the bend in suspension link 1. These shell elements 11, 12, which additionally increase the rigidity and strength of suspension link 1, enclose an additional cavity 15 or 15' with the respective side walls of the molded part body 7.

Figure 2:
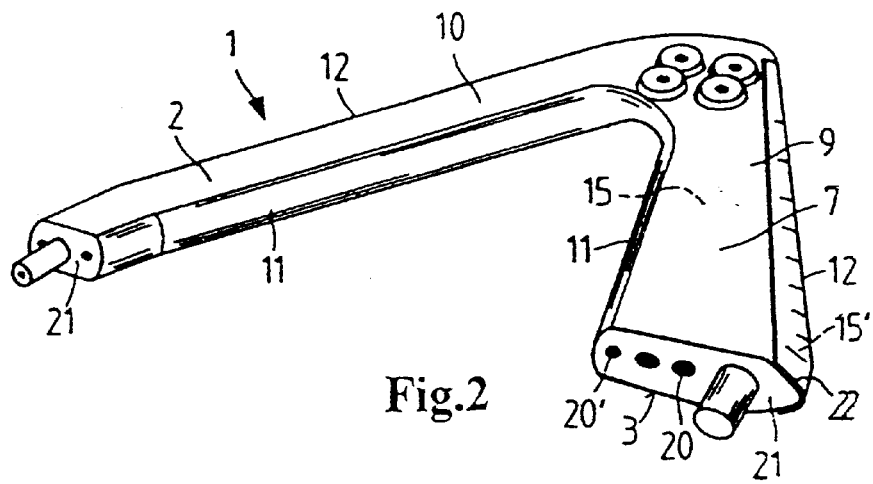
FIG. 2 is a perspective view of suspension link similar to that of FIG. 1 but as viewed in the direction of the ends of the suspension.

As shown in FIG. 2, the multipartite nature of suspension link 1 made of molded part body 7 and shell elements 11 and 12 is not visible from outside because the connecting edges have been smoothed, and suspension link legs 9, 10 and the bending section between them have been jacketed with a bonded fiber material that can be applied by, for example, gluing or spraying.

As an additional measure for increasing the rigidity and strength of the suspension link 1 that comprises this molded part body 7, lengthwise-running tubes 16 are inserted into cavity 6 of molded part body 7. The tubes 16 are secured at at least one point by soldering or welding. As seen in FIG. 1, the shell elements 11, 12 also receive tubes 17 which can also be guided alternately from one cavity 15 into another cavity 6.

In order to show the full course of path of the tubes 16 and 17 clearly, in FIG. 1, in cross section, the molded part body 7 and the shell elements 11, 12 together with the tube cross sections located there are represented at various portions by dot-dashed lines, and a portion on the left-hand leg side and also on the right hand leg side of suspension link 1 are shown with tubes 16, 17 which are visible through the walls, i.e. are represented by solid lines. The suspension link 1 can be connected with a bearing point 8 in the vicinity of a hub carrier and with bearing points 18, 18' at a vehicle chassis.

Tubes 16, 17, which can be freely chosen in terms of material and configuration for their reinforcing function, also have the task of receiving cables and/or lines 19 which then do not create any problems outside the suspension link and are not themselves damaged. These cables and/or lines 19 for ABS control, as brake lines, or as power cables for example, are introduced into openings 20, 20' of tubes 16, 17 that are accessible from the outside molded part body 7 and/or the shell elements 11, 12 and are not additionally secured in tubes 16, 17, so that under the tension that occurs in a crash, they can yield for a distance in the lengthwise direction and are not immediately torn away. These openings 20, 20' are also provided in end plates 21 at the free ends of suspension link legs 9, 10. The soldered or welded end plates 21 also serve to seal off cavities 6, 15, 15' so that no dirt or moisture can penetrate the suspension link 1.

The step of jacketing the suspension link 1 with a bonded fiber material, CfK for example, can additionally increase the strength of suspension link 1.

Suspension link 1 is also suitable for securing a side protector 22 along a leg 9 or 10 and can also be used in a motorcycle swing arm.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Motor vehicle component, comprising a metal suspension link jacketed with a bonded fiber material, wherein the suspension link has two molded parts running lengthwise and having a shell-shaped cross section, said parts being joined at lateral lengthwise edges thereof to form a molded part body delimiting a cavity, with at least one lengthwise-running tube being secured in the cavity.

2. Motor vehicle component, comprising a metal suspension link jacketed with a bonded fiber material, wherein the suspension link comprises two elongate molded parts shell-shaped in cross section, said parts being joined at lengthwise lateral edges thereof to form a molded part body delimiting a first cavity, with an elongate shell element being attached along at least one long side to the molded part body, said element enclosing a second cavity with a wall of the molded part body.

3. Motor vehicle component according to claim 2, wherein at least one lengthwise-running tube is secured in at least one of the first cavity and the second cavity.

4. Motor vehicle component according to claim 1, wherein openings of the at least one tube are accessible from outside the molded part body or shell element.

5. Motor vehicle component according to claim 2, wherein openings of the at least one tube are accessible from outside the molded part body or shell element.

6. Motor vehicle component according to claim 4, wherein at least one cable or line is guided through the at least one tube.

7. Motor vehicle component according to claim 3, wherein the at least one tube is guided alternately from the second cavity to the first cavity.

8. Motor vehicle component according to claim 2, wherein the cavities are covered by end plates at free ends of the suspension link.

9. Motor vehicle component according to claim 8 wherein the end plate has at least one access opening to the at least one tube.

10. Motor vehicle component according to claim 9, wherein the suspension link has two molded parts running lengthwise and having a shell-shaped cross section, said parts being joined at lateral lengthwise edges thereof to form a molded part body delimiting a cavity, with at least one lengthwise-running tube being secured in the cavity.

11. Motor vehicle component according to claim 10, wherein at least one lengthwise-running tube is secured in at least one of the first cavity and the second cavity.

12. Motor vehicle component according to claim 1, wherein a suspension link has two suspension link legs projecting in a V-like shape from a bearing point.

13. Motor vehicle component according to claim 12, wherein a suspension link for the wheel suspension is jacketed with the bonded fiber material.

14. Motor vehicle component according to claim 12, wherein a shell element is arranged to run in one piece around a end in the suspension link.

15. Motor vehicle component according to claim 14, wherein the suspension link comprises two elongate molded parts shell-shaped in cross section, said parts being joined at lengthwise lateral edges thereof to form a molded part body delimiting a first cavity, with an elongate shell element being attached along at least one long side to the molded part body, said element enclosing a second cavity with a wall of molded part body.

* * * * *